J. H. HAMMOND, Jr.
SYSTEM AND APPARATUS FOR CONTROLLING TORPEDO FIRING.
APPLICATION FILED SEPT. 14, 1915.

1,431,141.

Patented Oct. 3, 1922.
10 SHEETS—SHEET 1.

Inventor:
John Hays Hammond, Jr.
by Emery, Booth, Janney and Varney
Attys

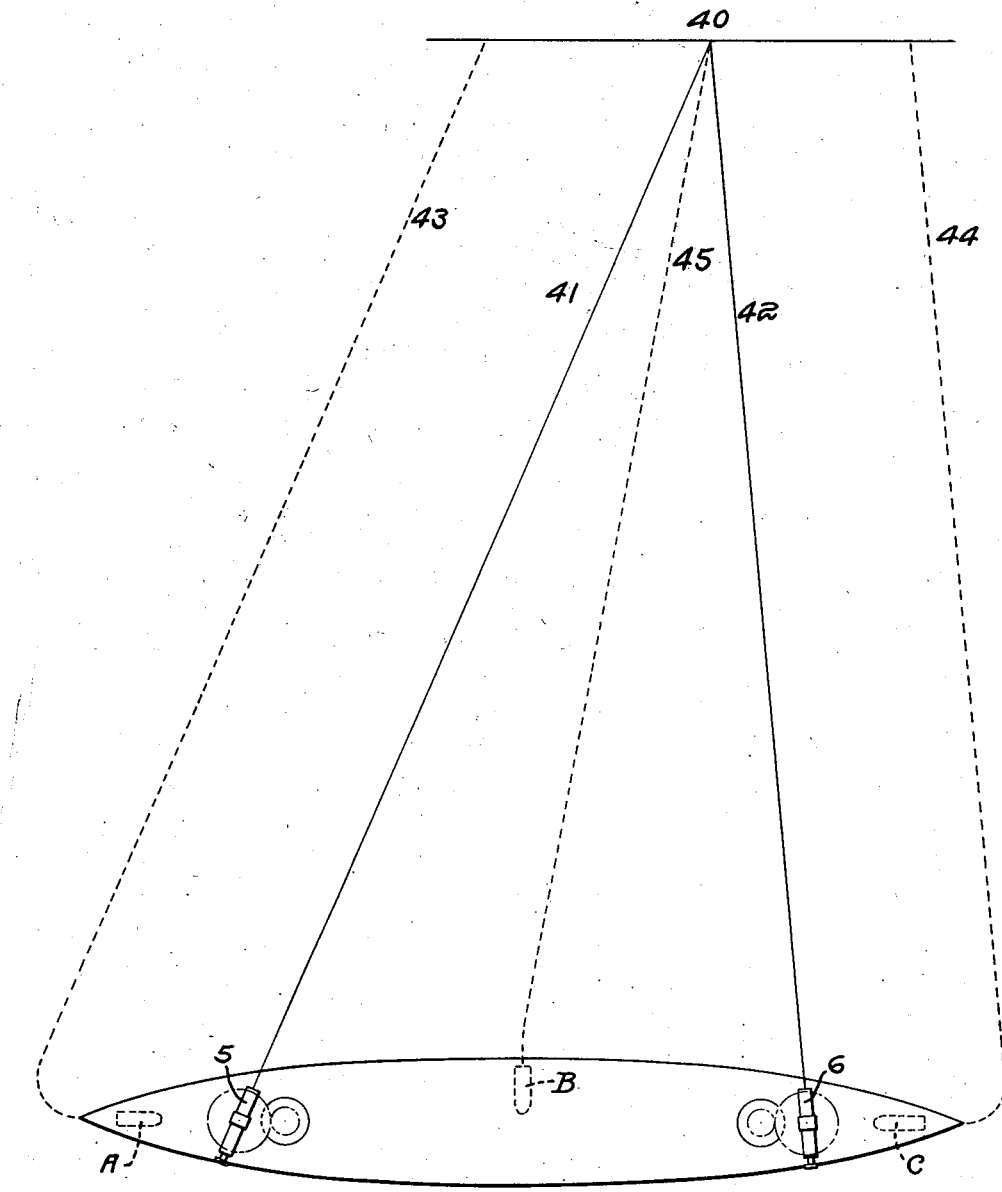

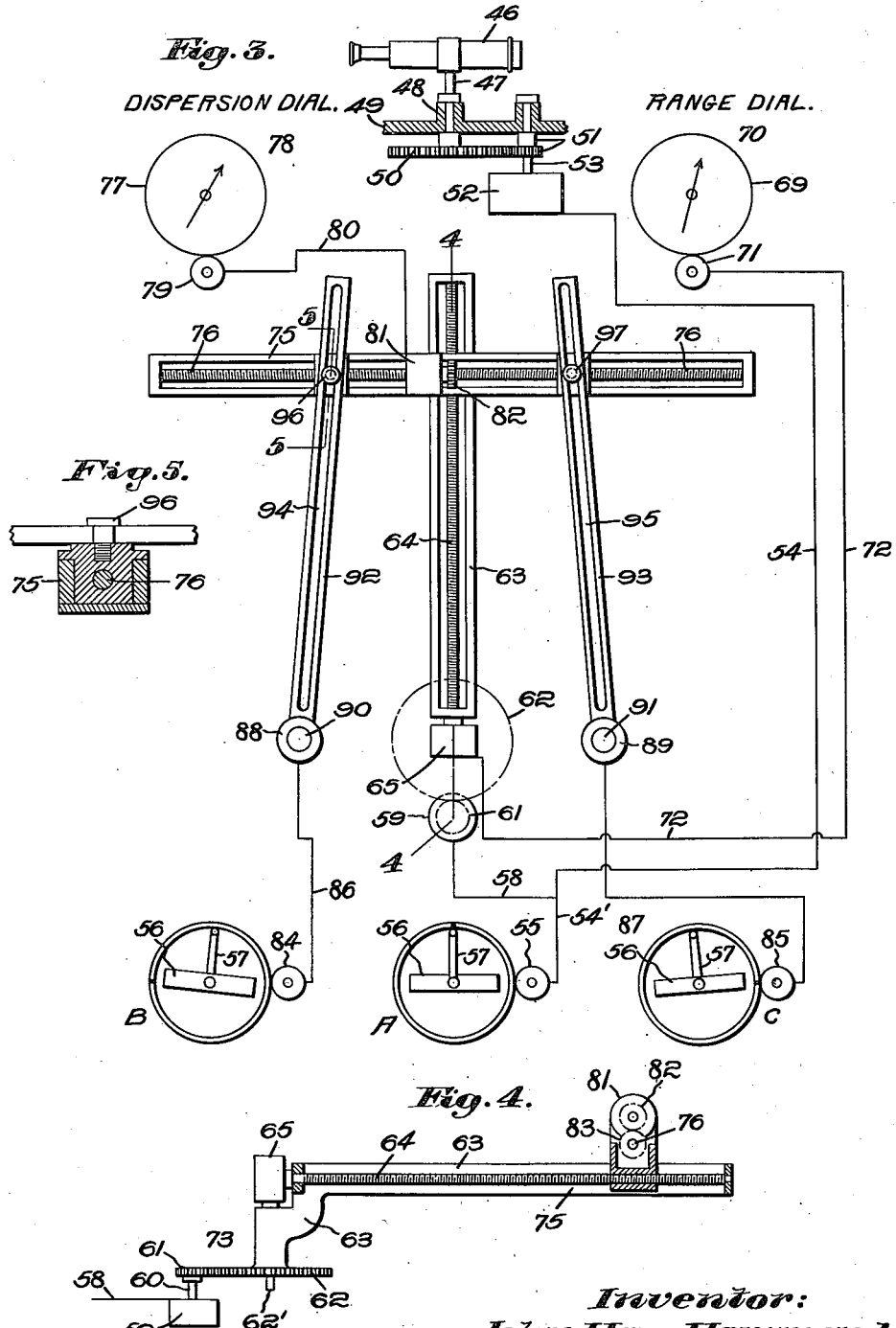

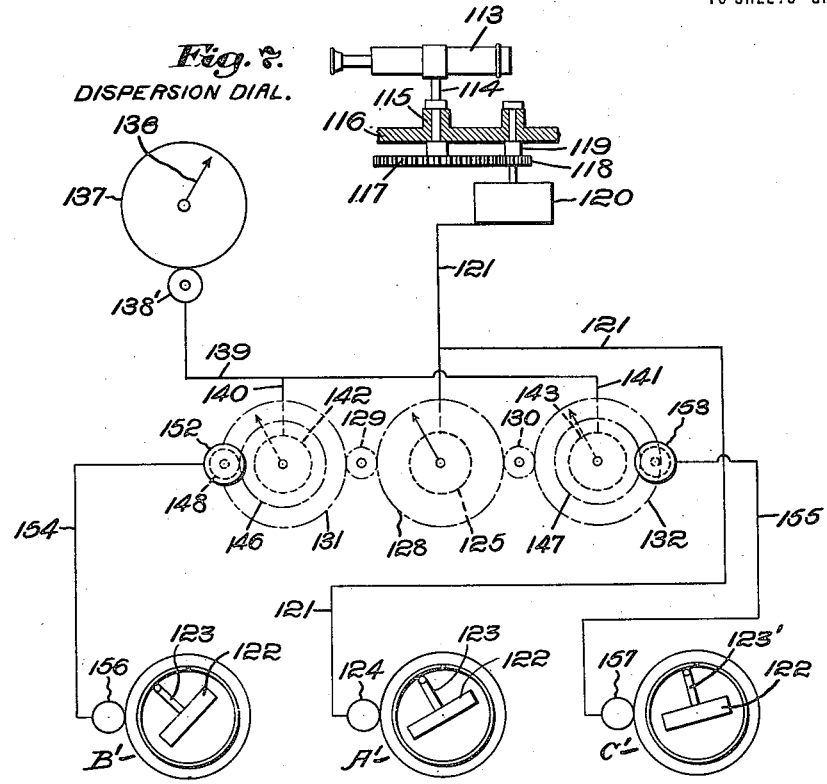

J. H. HAMMOND, Jr.
SYSTEM AND APPARATUS FOR CONTROLLING TORPEDO FIRING.
APPLICATION FILED SEPT. 14, 1915.
1,431,141.
Patented Oct. 3, 1922.
10 SHEETS—SHEET 6.
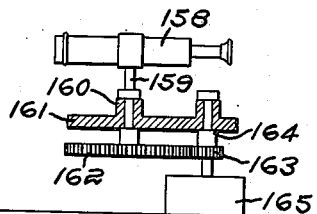
Fig. 10.
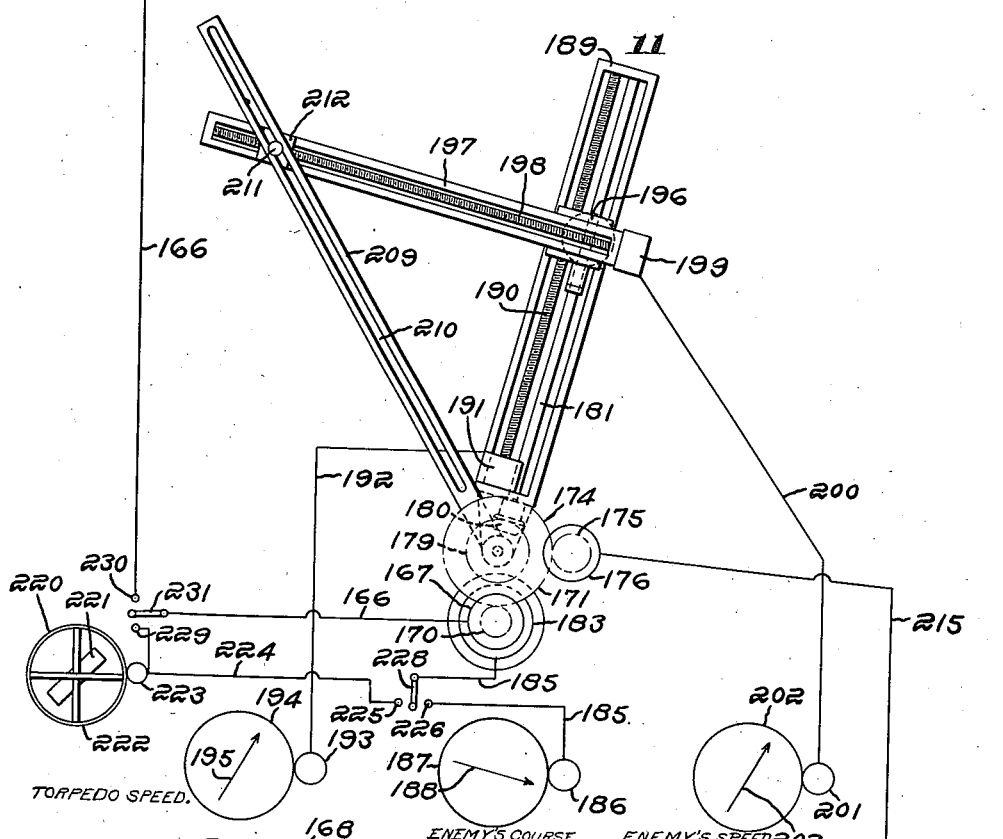
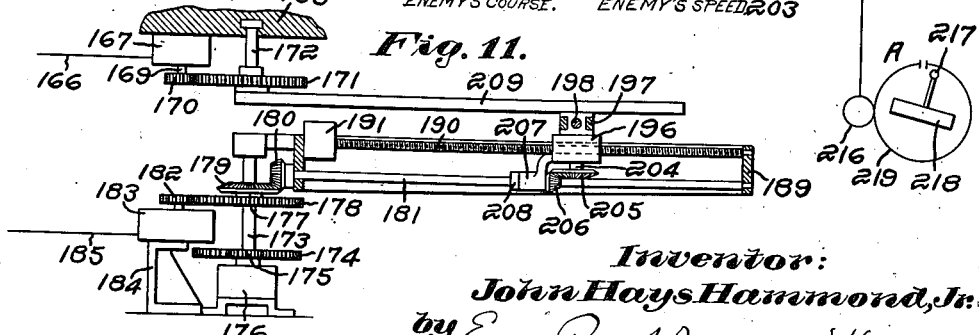
Fig. 11.
Inventor:
John Hays Hammond, Jr.
by Emery, Booth, Janney and Varney
Attys J. H. HAMMOND, Jr.
SYSTEM AND APPARATUS FOR CONTROLLING TORPEDO FIRING.
APPLICATION FILED SEPT. 14, 1915.

1,431,141.

Patented Oct. 3, 1922.
10 SHEETS—SHEET 7.

Inventor:
John Hays Hammond, Jr.
by Emery, Booth, Janney and Varney
Att'ys.

J. H. HAMMOND, Jr.
SYSTEM AND APPARATUS FOR CONTROLLING TORPEDO FIRING.
APPLICATION FILED SEPT. 14, 1915.
1,431,141.
Patented Oct. 3, 1922.
10 SHEETS—SHEET 8.
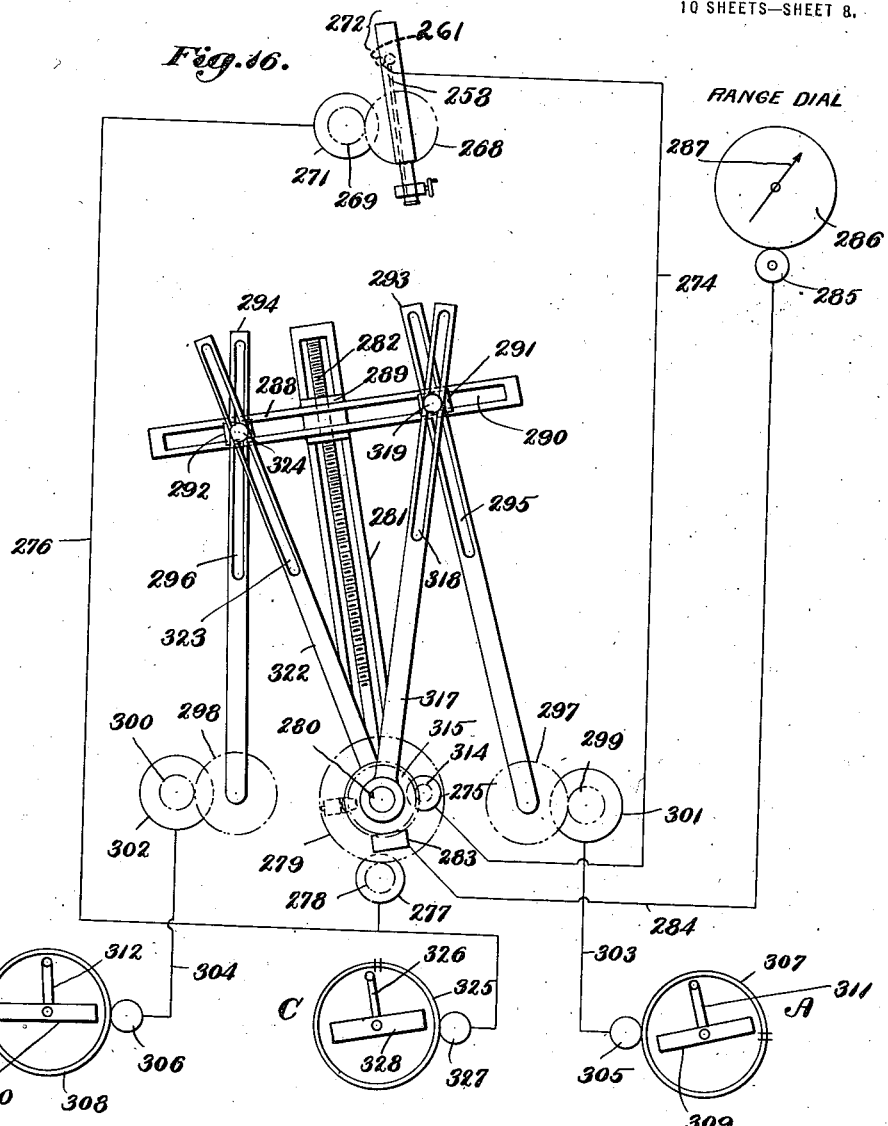
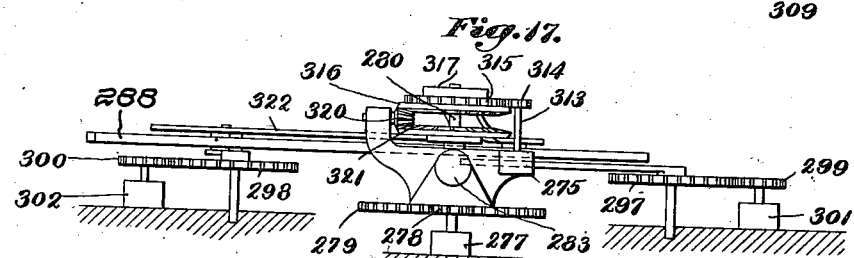

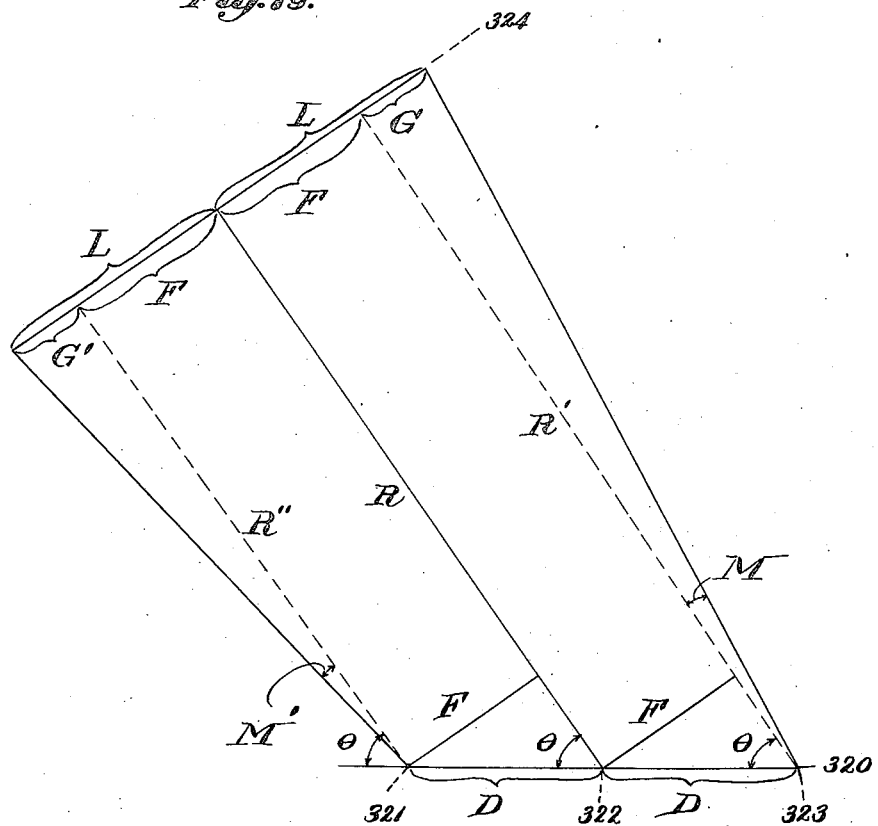

Patented Oct. 3, 1922.

1,431,141

UNITED STATES PATENT OFFICE.

JOHN HAYS HAMMOND, JR., OF GLOUCESTER, MASSACHUSETTS.

SYSTEM AND APPARATUS FOR CONTROLLING TORPEDO FIRING.

Application filed September 14, 1915. Serial No. 50,719.

*To all whom it may concern:*

Be it known that I, JOHN HAYS HAMMOND, Jr., a citizen of the United States, and a resident of Gloucester, in the county of Essex and State of Massachusetts, have invented an Improvement in Systems and Apparatus for Controlling Torpedo Firing, of which the following description, in connection with the accompanying drawings, is a specification, like characters on the drawings representing like parts.

This invention relates to systems and apparatus for controlling torpedo firing.

In order that the principle of the invention may be readily understood, I shall describe certain types of apparatus for carrying out such system, which is particularly adapted for controlling the firing of torpedoes from vessels either submersible or non-submersible. My invention, however, is in no wise limited to such use, but is adapted for the control of torpedo firing not only from a ship, but from the shore or other station. For convenience of description, but not for purposes of limitation, I shall hereinafter refer to the discharge of a torpedo or torpedoes from a ship.

Prior to my invention disclosed in my copending application No. 43,849, the firing of torpedoes from fixed tubes in moving vessels has been a matter of very considerable difficulty, particularly in submarine work. Inasmuch as the tubes form an integral part of the hull of the submarine, it has been necessary in order to train the tubes, to position the longitudinal axis of the submarine in the direction of the target. Therefore, in order to use the bow tubes the submarine is forced to advance head-on to the target, and is often placed in a disadvantageous tactical position. Moreover, with the present method of torpedo firing, only certain tubes can be fired at a time and the location of these upon the vessel is such as to require certain fixed maneuvers to be carried out by the submarine.

In accordance with my system, the torpedoes may be fired from fixed tubes irrespective of the orientation of the longitudinal axis of the submarine or other vessel, and a plurality of torpedoes may be fired simultaneously or otherwise by different tubes and if desired, in such a manner as to converge toward or diverge from a common point upon said target. In accordance with my system, I preferably provide means whereby the degree of dispersion of a plurality of torpedoes, whether of convergence or divergence, with respect to a given target may be controlled. In carrying out these and other objects, I may provide a centralized control or a plurality of controlling apparatus or devices, which, in the preferred embodiment of my invention, are devices that may be defined as "sighting apparatus" inasmuch as in their use they involve the visual sense. As instances of such sighting apparatus, I mention without limiting myself thereto, the telescope, the periscope, projectors of light rays and indicating dials.

In the accompanying drawings,

Fig. 2 is a diagrammatic representation indicating the effect of simultaneous torpedo firing by the use of the apparatus or means shown in Fig. 1;

Fig. 3 is a view, mainly diagrammatic but partially in plan and partially in section, of another form of means that may be employed in carrying out my system;

Fig. 4 is a detail, mainly in section, upon the line 4—4 of Fig. 3;

Fig. 5 is a further detail upon the line 5—5 of Fig. 3;

Fig. 7 is a view, mainly diagrammatic, of still another form of means which may be employed in carrying out my system;

Fig. 8 is a view partially in side elevation and partially in vertical section, of the mechanism shown in Fig. 7;

Figure 12:
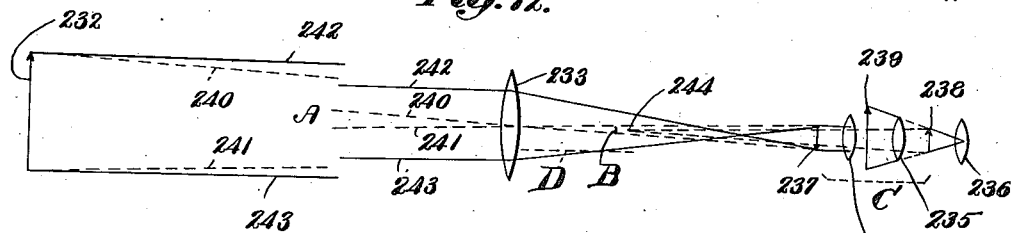
Figure 13:
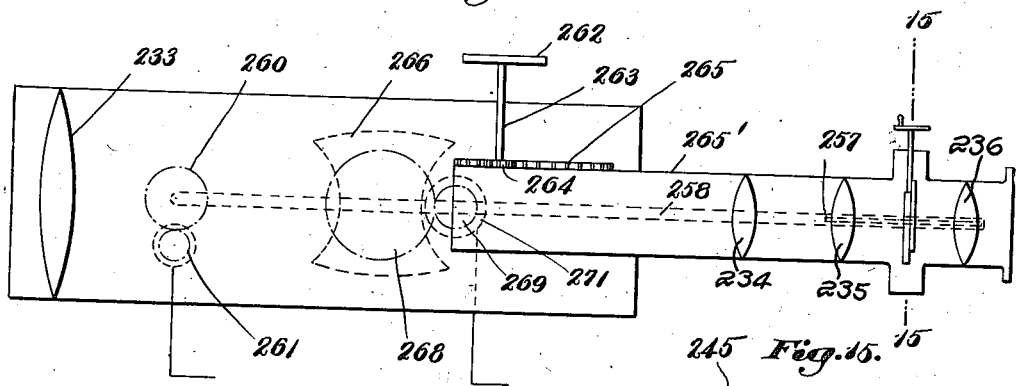
Figure 15:
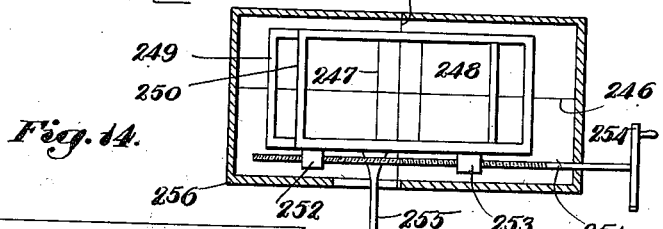
Figure 14:
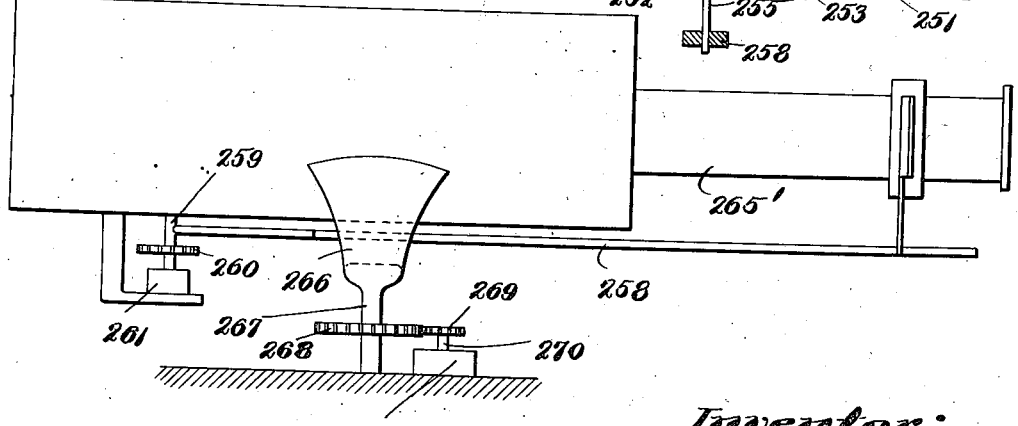
Figure 20:
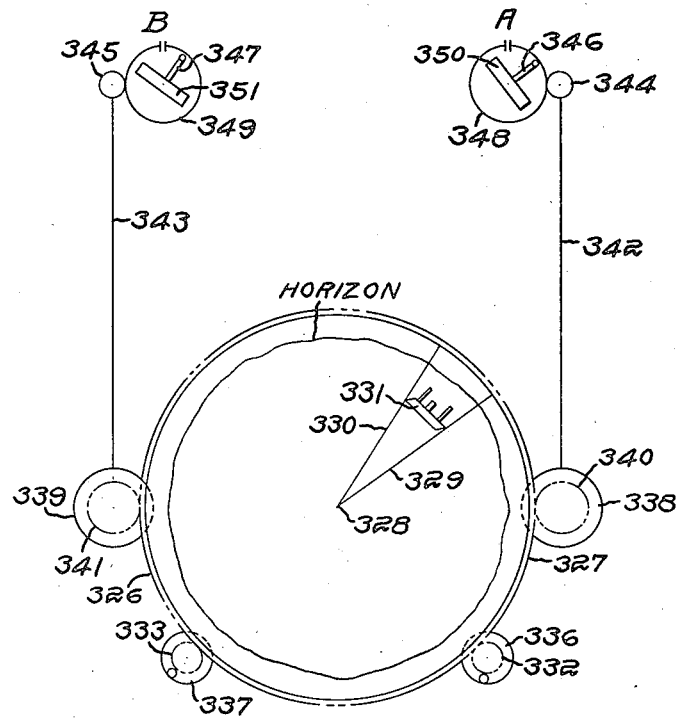
Figure 21:
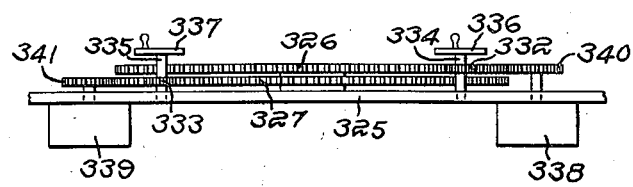

Fig. 9 indicates a table which may be employed with that form of my invention shown in Figs. 7 and 8;

Fig. 10 is a view partially in plan and mainly diagrammatic of still another form of my invention;

Fig. 11 is a view partially in side elevation and partially in section of a portion of the structure shown in Fig. 10;

Fig. 12 is a diagrammatic representation of the principles governing one form of sighting instrumentality which may be employed in the practice of my invention;

Fig. 13 represents in plan view a telescope that may be employed as the said instrumentality in practicing my invention;

Fig. 14 is a side elevation of the construction shown in Fig. 13;

Fig. 15 is a transverse section, on an enlarged scale, taken on the line 15—15 of Fig. 14;

Fig. 16 is a view, partially in plan but largely diagrammatic, of still another embodiment of my invention;

Fig. 17 is a front elevation of a portion of the construction shown in Fig. 16;

Fig. 18 indicates a table that may be employed by me where the torpedoes are fired from tubes located at different positions upon the ship;

Fig. 19 is a diagram indicating how certain values in said table may be obtained;

Fig. 20 is a view partially in plan and partially diagrammatic of still another form of my invention; and Fig. 21 is a front elevation of a portion of the structure shown in Fig. 20.

Figure 1:
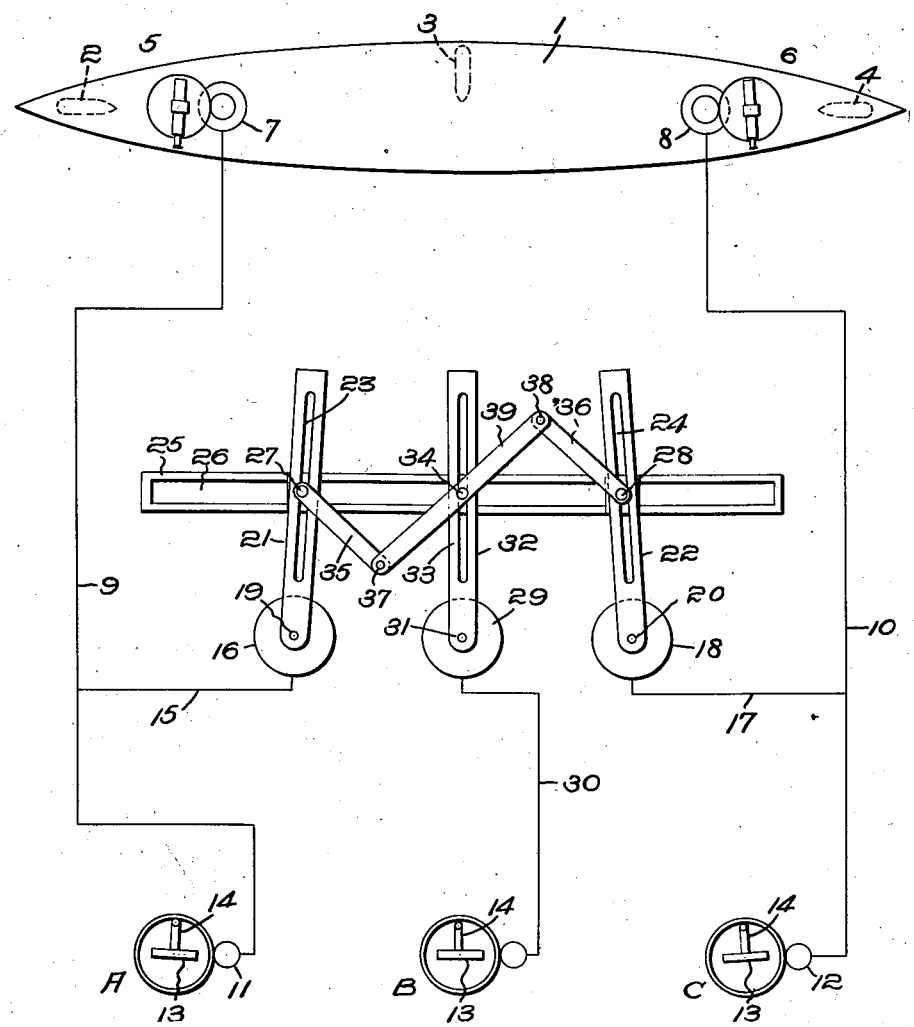
Fig. 1 is a diagrammatic representation of one form of means for controlling the fire of a plurality of torpedoes from a vessel or other basal support.

Referring first to that form of my invention shown in Fig. 1, I have therein represented one form of means whereby a plurality of torpedoes may be so discharged as to strike the same point, or substantially the same point, upon the object to be attacked, which may be either moving or stationary, but which, in this description, I shall assume to be stationary.

Therein the vessel whereon the torpedoes are carried is indicated at 1, it being herein represented as a non-submersible. It may, however, be of the submersible type. For convenience of description and explanation, I have herein represented the same as provided with three torpedo tubes 2, 3, 4, located at the bow and stern and at one side of the ship. Obviously, however, the torpedo tubes may be otherwise positioned, and any desired number thereof may be employed. In practice, torpedo tubes would be provided at both starboard and port and a plurality thereof would be provided at both the bow and stern.

Preferably I provide two sighting devices, herein typified as telescopes 5, 6, which may be similar in mounting and mode of operation to those shown in my co-pending application Serial No 43,879 If desired, I may provide a single or centralized sighting apparatus for all the torpedo tubes, but for simplicity of construction, I preferably provide at least two such sighting devices. Said sighting devices 5 and 6 pertain to the torpedo tube 2 and 4, and in actual practice would be located substantially directly thereover. For clearness of illustration, I have represented them as somewhat removed therefrom. If desired, I may provide a third sighting apparatus for the torpedo tube 3, but preferably and also for simplicity of construction I do not provide a sighting apparatus pertaining only to the torpedo tube 3, but employ co-acting means whereby the telescopes 5 and 6 may in their movements control the firing of the torpedoes from the tube 3.

In connection with each telescope 5, 6, I provide a transmitter 7, 8, which may be of the general type referred to in my said co-pending application, and extending therefrom are electrical conductors 9, 10, leading to repeaters 11, 12, upon the torpedoes within the tubes 2 and 4. The conductors 9, 10, which extend from the ship 1 into the torpedoes are provided with suitable plugs, not shown, whereby when the torpedoes are discharged, the conductors are automatically severed.

I have herein generally indicated the torpedoes carried by the tubes 2, 3, 4 at A, B and C, each of them being provided with some suitable direction-maintaining mechanism or device such, for example, as a gyroscope of any of the types disclosed in my said co-pending application. The said gyroscope may itself be controlled or governed or modified in action by any of the forms of mechanism shown in said co-pending application, or otherwise, and involving for example a so-called azimuth ring which may be fixed and relative to which the contact arm or member may be moved in synchronism with the movement of the sighting apparatus, or which azimuth ring may itself be moved in synchronism with but in an opposite direction to the movement of the sighting apparatus and to an equal extent. Other governing or modifying means may be employed. It is unnecessary in the present application to refer thereto or to illustrate the same in detail.

In said Fig. 1, I have indicated each torpedo as having a gyroscope 13 and a contact arm 14, preferably similar in construction and function to that shown in Figs. 1, 2 and 3 of said co-pending application. In circuit with the transmitter 7 and torpedo repeater 11, by means of the conductor 15 is a repeater 16 positioned upon the ship, and in circuit with the transmitter 8 and the repeater 12, by means of a conductor 17, is a repeater 18 also upon the ship. Pivotally mounted upon the shafts 19, 20 of said repeaters 16, 18, are arms 21, 22, having longitudinal slots 23, 24. These arms move in synchronism and remain parallel to the telescopes 5 and 6, respectively. Fixedly mounted upon some suitable part of the ship is a plate or track 25 having therein a longitudinal groove or slot 26. I provide two riders or blocks 27, 28 which slide in groove 26 and have pins extending therefrom and adapted to slide in grooves 23 and 24, respectively. The said arms 21, 22 are adapted through the transmitters and repeaters to be turned so as to be trained upon the hostile vessel or other object. In the present example of the use of my invention, I have represented the arms 21 and 22 as converging toward a common or substantially common point upon the hostile object, since it is not only desired that the torpedoes A and C may strike such common point, but also that the torpedo B also strike such point.

As already stated, for simplicity of construction, I preferably do not provide an independent sighting device and cooperating connections for the torpedo tube 3. Instead thereof I provide some suitable means whereby the training of the arms 21, 22 upon the hostile object will cause the training thereon of an arm pertaining to the torpedo B. In this form of my invention, I have represented a transmitter 29 in circuit with the repeater of the torpedo B by means of the conductor 30. Mounted upon the shaft 31 of said transmitter 29 is an arm 32 having a longitudinal groove 33 which is adapted to receive a pin 34 carried by a rider or block which slides in groove 26 of the plate or track 25. Pivotally connected with the pins which extend through riders 27, 28 are arms 35, 36 which are in certain forms of my invention, and are herein represented as of the same length. They are pivotally connected at 37, 38 with an arm 39, pivotally connected to a pin carried by the rider or block 34. The construction and arrangement of parts are such that the movements of the arm 21, 22 caused by the sighting movements of the telescopes 5 and 6, impose, through the arms 35, 36, 39, such movement upon the arm 32 as to control the path of travel of the torpedo B in such manner that it will strike the hostile object at the same point or at substantially the same point where the torpedoes A and C strike.

In the diagram shown in Fig. 2, I have indicated the hostile vessel or other object at 40 and the lines of sight from the telescopes 5 and 6 at 41 and 42. The paths of travel of the torpedoes A and C imposed thereon in the manner described in my said copending application are indicated by dotted lines at 43, 44. The line of travel of the torpedo B imposed thereon by the connections between the arms or members 21, 22, 32 is indicated in dotted lines at 45.

It will be noted that the said lines of travel 43, 44 and 45 converge but in the disclosed example of the use of my invention, they do not meet at a common point upon the object, owing to the lateral displacement of the paths of travel 43, 44, from the lines of sight 41, 42 incident to the slight period of time required for the turning of the torpedoes after they discharge from their tubes. This difference in actual practice between the lines of travel of the torpedoes and the said lines of sight will be small, and if necessary or desirable may be corrected for in any suitable manner.

While I have referred to a single torpedo tube 3 in Fig. 1, and have represented the same as midway between the torpedoes 2 and 4, it will be evident that any desired number of intermediate torpedo tubes may be provided and that they may be positioned at any desired intervals, equal or otherwise, with respect to the torpedoes 2 and 4. This may be effected by elaborations of the connecting arms 35, 36 and 39 in case a plurality of intermediate torpedoes are provided, or by providing arms 35, 36 of unequal lengths, if it be desired to provide a single, intermediate torpedo tube positioned at a point not equidistant between the torpedo tubes 2 and 4.

In that form of my invention represented in Figs. 3, 4 and 5, I have shown one form of means whereby a plurality of torpedoes may be discharged at a fixed or moving object, but wherein instead of so firing the torpedoes that they strike a common point upon the hostile object, I effect a controlled amount of dispersion of the torpedoes, either of convergence or of divergence. While this result may be accomplished in many different ways, I have herein represented a telescope 46 which may constitute a centralized control and be located amidships. Obviously for said telescope I may substitute a periscope if the apparatus be employed upon a submarine. Any other suitable sighting apparatus may be employed.

The said telescope is mounted upon a shaft 47 supported in a bearing 48 in the framing 49 of the ship, the said shaft having fast thereon a gear 50. Also mounted upon the framing 49 is a shaft 51 of a suitable transmitter 52 and having fast thereon a pinion 53 meshing with and turned by said gear 50. Leading from the transmitter 52 are suitable conductors diagrammatically indicated at 54 and extending through the hull of one of the torpedoes, a suitable plug, not shown, being employed in the extension 54' of the conductor 54, whereby upon discharge of the torpedo, the said conductors may be automatically severed.

The said conductor 54' extends to a repeater 55 upon one of the torpedoes A, which may be a torpedo to be fired from a tube upon the starboard or port side—that is, from some intermediate point between the bow and stern torpedoes. The said torpedo may be provided with means such as disclosed in my said co-pending application whereby suitable direction-maintaining means thereon are controlled or modified so that the steering mechanism upon the torpedo is thereby so turned as to cause the torpedo to strike the desired object. I have herein indicated said torpedo as provided with a rotor 56 and a contact arm 57 which is turned synchronously with the turning of the telescope 46, so as to position it with relation to the azimuth ring, not herein necessary more fully to describe. Leading from the conductor 54 is a conductor 58 extending to and operatively connected with a repeater 59. As shown most clearly in Fig. 4, the repeater 59 is provided with a shaft 60 having thereon a pinion 61 meshing with a gear 62 having rigidly mounted thereon an arm 63. In said arm 63 is mounted a threaded shaft 64 which is turned by a repeater 65, whereby through said repeater 59 the arm 63 may be turned toward the hostile object.

By some independent instrument or mechanism the range of the hostile vessel or object is determined. I provide a suitable dial 69 which may be employed to indicate the range of the hostile vessel or other object. Upon ascertaining the range through some independent source, I suitably turn the indicator 70 which acting through the transmitter 71 and the electrical conductors 72 operates a suitable repeater 65 adapted to turn the screw-threaded shaft 64 so as to rotate the same to an extent dependent upon the range of the hostile vessel and thereby to move toward or from the repeater 65 a transverse frame or member 75, herein represented as having mounted therein for rotation a right and left threaded screw shaft 76.

At a suitable point upon the vessel I provide a so-called dispersion dial 77 having an indicator 78 which I may turn after having determined the dispersion in feet at the range. The said dial has associated therewith a suitable transmitter 79 which is electrically connected by suitable conductors 80 with a repeater 81 having thereon a suitable pinion 82 adapted to rotate a pinion 83 fast upon the said oppositely threaded shaft 76, whereby said shaft will be rotated to an extent corresponding to the desired dispersion.

In addition to the intermediate torpedo A I have herein represented torpedoes B and C which may be the bow and stern torpedoes. I have represented each of these as provided with rotors 56 and contact arms 57 which may be similar to those described with reference to the torpedo A. In operative relation to each of said torpedoes I provide repeaters 84, 85 leading from which respectively are electrical conductors 86, 87 which may be provided with severing plugs of the character previously referred to. The conductors 86, 87 extend to suitable transmitters 88, 89, upon the shafts 90, 91 whereof are mounted for turning movement arms 92, 93 longitudinally slotted as indicated at 94, 95, and receiving therein portions of nuts 96, 97 mounted respectively upon the right and left threaded portions of the shaft 76.

The construction and arrangement of parts are such that the bracket or member 75 will be moved toward or from the repeater 65 by a distance dependent upon the range of the hostile object. This, as previously stated, will be effected through the range dial 69. Through the dispersion dial 77 the arms 92, 93 will be moved toward or from each other by rotation of the screw threaded shaft 76 whereby the proper direction is imposed upon the said arms 92, 93 so as to give the desired dispersion at the target, it being noted that the centers of the shaft 90, 62' and 91 are spaced in the same scale as the range and dispersion, to indicate the distance apart of the torpedo tubes. Through the action of the transmitter 52 and the repeater 59, the arm 63 will be moved so that it is directed toward the hostile object. By reason of the fact that the arms 92, 93 and 63 are connected by the screw threaded shaft 76, the angular movement of the arm 63 will be also imposed upon the said arms 92, 93, whereby said arms will also be directed toward the hostile object, but varied in direction therefrom by the determined amount of dispersion. By means of the transmitters 88, 89 and the repeaters 84, 85, the movement of the arms 92, 93 will be imposed upon the contact arms 57, 57 of the torpedoes B, C and their paths of travel thereby controlled.

Figure 6:
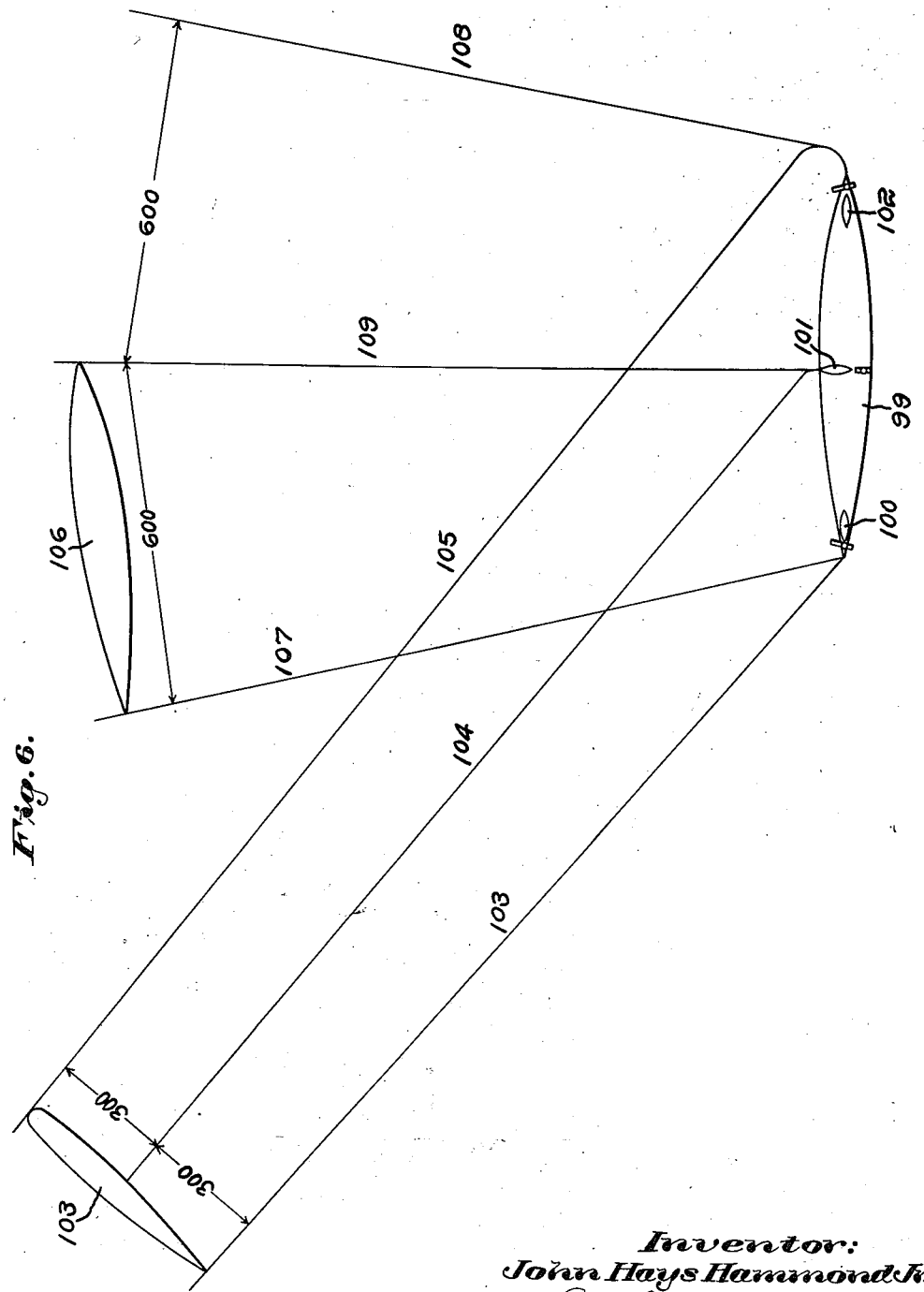
Fig. 6 is a diagrammatic representation indicating the effect of simultaneous torpedo firing by the use of the apparatus shown in Figs. 3, 4 and 5.

In Fig. 6, I have diagrammatically indicated the lines of travel of three torpedoes discharged from the ship indicated at 99. Therein the torpedo tubes are indicated at 100, 101 and 102. If, for example, a dispersion of 300 feet is desired, and the hostile vessel is at the point 103, the arms 92, 63 and 93 are so turned in the manner described as to cause the torpedoes to travel along the paths 103, 104 and 105. I have represented distances of 300 feet by which the paths 103, 104 and 105 of the torpedoes are separated when they reach the target, this indicating the amount of dispersion.

I have also upon said figure indicated a hostile vessel at 106 and have herein made the amount of dispersion equal to the length of a vessel—say 600 feet, so that one of the torpedoes would hit the vessel in a danger zone of 1,200 feet. I have indicated the paths of the torpedoes at 107, 108 and 109.

In Figs. 7 and 8, I have represented still another form of means for practicing my system, and whereby a desired degree of dispersion of the paths of travel of the torpedoes may be imposed thereon.

In said figures, the telescope or other sighting means is indicated at 113, it being mounted upon the shaft 114, itself mounted in a suitable bearing 115 upon the frame 116 of the vessel. The said shaft has fast thereon a gear 117 meshing with a pinion 118 upon a shaft 119 also mounted in the framing, the said shaft 119 being operatively associated with the transmitter 120. Extending from the said transmitter are electrical conductors diagrammatically indicated at 121 and leading through the hull of the torpedo which is indicated at A'. In order to permit the automatic severance of said conductors 121, they are provided with a suitable plug at the torpedo hull. The said torpedo A' is provided with any suitable direction-maintaining means, such, for example, as a gyroscope 122 with which may be operatively associated a contact arm 123 of the form shown in my said co-pending application. The conductors 121 extend to a suitable repeater 124 whereby a movement is imposed upon the contact arm 123 in synchronism with the movement of the telescope 113. I have herein represented three torpedo tubes A', B', C', preferably mounted near together upon any part of the ship and constituting a unit.

The conductor 121 extending from the transmitter 120 leads also to a repeater 125 having a shaft 126 suitably supported in the framing 127 and having fast thereon a gear 128, which therefore will be moved in synchronism with the gear 117. At the right and left of said gear 128 and meshing therewith are pinions 129, 130, also meshing with gears 131, 132 mounted upon shafts 133, 134 stepped in suitable bearings 135, 136 and also having bearings in the frame 127.

By reason of the intermeshing gears and pinions, the three gears 128, 131 and 132 move in synchronism with each other and with the telescope 113. That is to say, if no degree of dispersion is to be imposed upon the torpedoes B', C', the described movements of rotation of the gears 131, 132 are the movements that control the paths of travel of the torpedoes B', C'. In this example of my invention, however, I impose a modified path of travel upon the torpedoes B', C', dependent upon the degree of dispersion that is desired. For this purpose, I provide a dial 137 having a suitable indicator 138 which may be turned to an amount dependent upon the desired angle of dispersion.

In Fig. 9, I have indicated a table which I may employ in using that form of my apparatus shown in Figs. 7 and 8. Therein I have indicated generally a table or tabulation at D. In the vertical row entitled "Dispersion" I have placed figures 100, 200, 300, etc., which may indicate the desired dispersion in feet, yards, metres, etc. In the horizontal row entitled "Range," I have indicated ranges of 1000, 2000, 3000, etc., yards. In the other vertical rows, I have indicated angles in degrees, which have been determined by suitable mathematical computations as the degrees corresponding to certain ranges and certain dispersions in feet, yards, etc. Having ascertained the range and decided upon the desired dispersion, the table is read downwardly and from the left until at the meeting columns the desired angle is found, such, for example, as the angle Z''', indicating the dispersion of 300 feet at a range of 5000 yards. This represents the angle through which the indicator 138 of the dispersion dial is to be turned. Such movement is, as previously stated, one imposed upon or subtracted from the movement that is imparted to the gears 128, 131, 132 by the sighting movement of the telescope 113.

Operatively associated with said dial is a transmitter 138' and leading therefrom is an electrical conductor 139 having branches 140, 141, leading to repeaters 142, 143 working in opposite directions and which are mounted in operative relation with the gears 131, 132, whereby the desired amount of dispersion is imparted to the shafts 144, 145, of said repeaters. Fast upon said shafts 144, 145, are gears 146, 147, which therefore will be turned through the actual angular extent representing the desired path of travel of the torpedoes B', C'. Meshing with the gears 146, 147 are pinions 148, 149, the shafts 150, 151 whereof are operatively associated with transmitters 152, 153, from which lead conductors 154, 155 provided with suitable plugs, and extending to repeaters 156, 157, upon the torpedoes B', C', and constructed and arranged to move the contact arm 123, 123' thereof into such a direction that the lines of travel of the torpedoes B', C' will vary from the path of travel of the torpedo A' by the extent of the desired dispersion which in this example of my invention will be one of divergence.

In Figs. 10 and 11 I have shown still another form of my invention and one which may be employed in conjunction with other illustrative forms of the invention for the purpose of correcting for speed, range and other factors, the direction of discharge of the torpedo or torpedoes. Referring, for example, to the form of the invention shown in Fig. 3, the apparatus shown in Fig. 10 or a suitable portion thereof may be introduced into the proper circuit, as, for example, by breaking the conductor 54, whereby the arm 63 shown in said Fig. 3 may be corrected in position by reason of the several factors hereinafter referred to.

Referring more particularly to the construction shown in Figs. 10 and 11, I have there indicated a sighting instrumentality at 158. Such instrumentality may be of any suitable character, but is herein represented as a telescope. If the apparatus be employed upon a submarine, I may substitute a periscope for the telescope. The illustrative sighting instrumentality is supported on a shaft 159 mounted in a suitable bearing 160 in the frame 161 of the vessel. Fast upon said shaft is a gear 162 meshing with and driving a pinion 163 upon a shaft 164 also mounted in the frame 161 and operatively associated with the transmitter 165, leading from which are suitable conductors diagrammatically indicated at 166 and extending to a repeater 167 mounted in the frame 168 and having a shaft 169 fast whereon is a pinion 170 meshing with a gear 171 upon a shaft 172, also suitably mounted in the frame 168. Thus the gear 171 moves in synchronism with the telescope 158. In this form of my invention I have indicated one form of means whereby certain factors pertaining to a moving enemy ship may be suitably indicated and in such manner that a resultant movement may be imparted to a member and which herein is intended to be pointed in the direction in which the torpedo is to be fired. The result in such case is that the torpedo is fired in a direction determined upon in connection with the factors to which I have referred.

In carrying out my invention as represented in the present embodiment thereof, I provide a shaft 173 shown in Fig. 11 as in alignment with the shaft 172. Fast upon said shaft is a gear 174 in mesh with and driving a pinion 175 upon the shaft of a transmitter 176 suitably supported upon the frame. Loose upon said shaft 173 is a sleeve 177 having fast thereon two gears 178 and 179, the latter meshing with a bevelled pinion 180, fast upon a polygonally shaped shaft 181, hereinafter more fully referred to. The gear 178 is in mesh with a pinion 182 upon the shaft of a repeater 183 which is here represented as mounted upon a bracket 184.

The repeater 183 is connected by suitable conductors 185 with a transmitter 186 having a gear in mesh with a gear pertaining to the dial 187, the latter having a suitable indicator 188 which is adapted to be turned the proper distance to indicate the course of the enemy ship.

It is therefore evident that the positioning of the indicator 188 effects a corresponding positioning of the gear 178 which remains fixed after such positioning.

Upon said shaft 173 is fixedly mounted a radial arm 189 that is intended to be turned in the direction in which the torpedo is to travel upon or after its discharge from the vessel. The said arm is preferably formed as a rectangular frame and has mounted therein for rotation a screw shaft 190 that is adapted to be rotated by a repeater 191 electrically connected by conductors 192 with a transmitter 193 having a gear in mesh with a suitable portion of a dial 194 having an indicator 195 adapted to be positioned to indicate the speed of the torpedo that is to be discharged from the vessel. By turning the indicator 195 to the proper extent, the repeater 191 is correspondingly actuated and the screw shaft 190 is turned so as to move therealong to a corresponding distance a rider 196. Thus the distance of said rider 196 from the axis of the shaft 173 corresponds to the speed of the torpedo that is to be discharged.

I provide an arm or member 197 that is to be positioned in parallelism with the course of the enemy ship, the latter having been plotted from the factors that have been determined and including the direction and speed thereof. The said arm or member 197 is provided with a screw shaft 198 suitably mounted for rotation therein and having a repeater 199 which is electrically connected by conductors 200 with a transmitter 201, the latter having a gear meshing with a suitable element of a dial 202 having an indicator 203 that may be turned to indicate the speed of the enemy ship.

The arm 197 is mounted upon a shaft 204 which is loosely mounted in the rider 196 and having fast thereon a bevelled gear 205 meshing with a bevelled pinion 206 adapted to slide upon the polygonally shaped shaft 181 but adapted to be rotated by the rotation of said shaft. The said pinion 206 is provided with a sleeve or portion mounted in a suitable bracket 207 and is herein shown as having a collar 208 to retain the pinion within said bracket 207.

Fast upon the shaft 172 is an arm 209, which points in the same direction as the telescope 158 and follows it in azimuth and which, therefore, is mounted coaxially with the arm 189. The said arm 209 has therein a longitudinal slot 210 adapted to receive a pin 211 of a nut or rider 212 mounted upon the screw shaft 198 of the arm 197. I have previously stated that the position of the rider 196 with respect to the axis of the shaft 173 corresponds to the speed of the torpedo. The arm 197 having been primarily positioned in parallelism with the course of the enemy ship as the same has been plotted, the action of the transmitter 201 and repeater 199 is to move the nut or rider 212 along the threaded shaft 198 to such position that the distance between the nut 212 and the axis of the rider 196 corresponds to the speed of the enemy ship.

So long, therefore, as the course of the enemy ship remains unchanged, the arm 197 is maintained in parallelism therewith and notwithstanding changes that may be made in the position of the arm 189 consequent upon the position of the arm 209. Said arm 209 by means of the telescope 158 is trained upon the enemy ship and the construction and arrangement of parts are such that when the enemy ship is in line with said arm 209, the arm 197 being still retained in parallelism with the course of the enemy ship, the arm 189 is positioned in a line which indicates the course that the torpedo must take in order to strike the enemy ship.

As previously set forth, the gears 178 and 179 are maintained fixed in position by means of the repeater 183. Therefore, in the positioning of the arm 209 as previously set forth, the arm 197 is moved by said arm 209. It is, however, maintained in parallelism with the course of the enemy ship, this result being effected through the intermediary of the bevel gears 205 and bevel pinion 206 which are respectively of the same relative size as the bevel gear 179 and the bevel pinion 180. Therefore, in the adjustment of the arms 189 and 197 the bevel pinion 180 will roll about upon the bevel gear 179, which, as previously stated, is maintained in fixed position by the repeater 183. This will cause a rotation of shaft 181 which in turn rotates pinion 206 no matter what position the rider 196 may be in. This causes gear 205 to be rotated which in turn rotates the arm 197. As the two sets of gears and pinions have the same ratio the arm 197 will remain parallel to its original position.

The gear 174 is in mesh with a pinion 175 upon the shaft of the transmitter 176, the latter being electrically connected by conductors 215 with a repeater 216 operatively related to contact arm 217 or other functioning element of a gyroscope positioned upon a torpedo, the position whereof is indicated at A. The rotor of said torpedo gyroscope is indicated at 218 and the azimuth ring at 219, the construction of these parts being preferably similar to those heretofore described in connection with other forms of my invention.

It will therefore be evident that the position of the arm 189 and its gear 174 will so influence the gyroscope of the torpedo that when the latter is discharged it will follow a course which is that in which the arm 189 points when adjusted as hereinbefore set forth.

With the construction and arrangement of parts thus far described, it is necessary that the ship be maintained upon a fixed course after the arm 197 has been positioned and until the torpedo is discharged. It is, however, frequently desirable that the course of the ship be changed after the said positioning of the arm 197, and prior to discharging the torpedo. In order to permit this to be done without resetting said arm 197, I preferably provide gyroscopic compass 220 which may be of any suitable construction and the rotor whereof is diagrammatically indicated at 221. In mesh with some suitable gear 222 upon or associated with said gyroscopic compass is a repeater 223 from which lead suitable conductors 224 extending to a suitable terminal 225. Suitably adjacent to said terminal is a second terminal 226 from which conductors 185 extend to the transmitter 186. Between said terminals 225, 226 is a switch 228 which is in circuit with the repeater 183, the latter being, as previously set forth, controlled in its position by the dial 187 by which the course of the enemy ship may be indicated. By first placing the switch 228 in contact with the terminal 226, the arm 197 is set parallel with the course of the enemy ship by means of the dial 187. If now it be desired to maneuver the ship prior to discharging the torpedo, the switch 228 may be thrown into contact with the terminal 225 whereby the gyroscopic compass 220 will maintain the arm 197 parallel to the course of the enemy ship as previously established.

I may desire to employ my invention upon a submarine and to submerge the latter after the arm 197 has been positioned in parallelism until the course of the enemy ship, and held parallel thereto by the closing of switch 228 into contact with terminal 225, and prior to discharging the torpedo. In this embodiment of the invention, I may, therefore, provide terminals 229, 230 and an interposed switch 231, the latter being connected by the conductor 166 to the repeater 167. By moving the switch 231 into contact with the terminal 229, the gyroscopic compass 220 functions through the transmitter 223, and the repeater 167, to hold the arm 209 fixed in space.

In the foregoing description I have repeatedly referred to the employment of a sighting instrumentality, and have stated that the same may be of any suitable type, and may, for example, be a telescope or a periscope. In Figs. 12 to 15, inclusive, I have shown one form of telescope that may be employed as the sighting instrumentality in connection with various forms of my invention, and, in Figs. 16 and 17, I have indicated a mechanism which is peculiarly adapted for use in conjunction with that type of sighting instrumentality illustrated in Figs. 12 to 15, inclusive.

Referring first to Figs. 12 to 15, I have, in the diagrammatic illustration in Fig. 12, represented the enemy boat at 232, the objective lens of the telescope constituting the sighting instrumentality at 233, the rectifying lenses at 234, 235 and the eyepiece at 236. The inverted image of the enemy boat is indicated by the arrow 237, and the rectified image at 238, the enlargement thereof being indicated at 239. The rays passing from the enemy boat through the center of the lens 233 are indicated by the dotted lines 240, 241, and certain of the refracted rays passing through said lens at opposite sides of the center thereof are indicated at 242, 243. I have indicated the angle formed by the rays 240, 241 at one side of the lens at A, and the angle formed thereby at the opposite side of the lens at B. Said angles are, obviously, equal. At a position corresponding to the rectified image 238 I position certain hairs or hair lines, to be referred to, and by means of which the angle B may be mechanically indicated or plotted. Inasmuch as the inverted and rectified images 237 and 238 are separated by a distance which I have indicated by the dotted line C, therefore, in mechanically maintaining and transferring the angle B, I measure an equal distance indicated by the dotted line D from the center of the objective lens to a point 244, which constitutes the center of motion of certain mechanical parts to be described.

In Fig. 15 I have indicated the hair lines preferably employed by me. Therein at 245 I have indicated the usual upright, central hair line in the frame of the telescope, and at 246 the usual cross hair. These may be of the usual construction. In addition thereto I provide two upright hairs 247, 248, located in parallelism and which are adapted to be moved toward and from the center hair 245 according to the length of the rectified image 238 so that said hairs may be brought into register with the ends of said image. In order to move said hairs toward and from said center hair in parallelism I have herein provided two upright rectangular frames 249, 250, respectively, mounted for sliding movement in suitable guides, not herein indicated, and adapted to be moved in opposite directions by means of an oppositely threaded shaft 251 receiving nuts 252, 253, secured to said frames. The said shaft is mounted in a suitable bearing in the frame of the telescope and at its outer end is provided with a hand wheel 254, by means of which the frames may be moved in the proper direction to bring the hairs 247, 248 into precise register with the ends of the rectified image of the enemy boat.

Depending from the frame 249, in alignment with the hair 247, is a rod or arm 255 extending through the frame of the telescope 256 and into a longitudinal slot 257 in a lever 258, pivoted at 259 in vertical alignment with the point 244 indicated in Fig. 12 and which was obtained as heretofore set forth. The pivotal portion of the lever 258 is a shaft, having fast thereon a gear 260 and a transmitter 261 is connected to said shaft so as to convey motion therefrom and hence from the lever 258.

The telescope is provided with any suitable focusing means. I have herein, for the purpose, represented a thumb nut 262, upon a spindle 263, having thereon a pinion 264, meshing with a rack 265 upon the portion of the telescope indicated at 265'. In this, or in any other suitable manner, the telescope may be focused.

The telescope is mounted for orientation upon a support 266, forming an extension of a shaft 267, having fast thereon a gear 268, meshing with a pinion 269 upon the shaft 270 of the transmitter 271, whereby in a manner already fully described in connection with various forms of my invention, other parts of the mechanism may be oriented in synchronism with the telescope.

In Figs. 16 and 17, I have represented a form of my invention which is particularly adapted for use in connection with the type of sighting instrumentality illustrated in Figs. 12 to 15, inclusive.

Therein the sighting instrumentality is indicated generally at 272. The said sighting instrumentality is provided with the lever 258 shown in Fig. 14 and operatively associated with the latter, so that the angular movement thereof may be transmitted, is a transmitter 261 electrically connected by conductors diagrammatically indicated at 274 with a repeater 275.

The said sighting instrumentality has its supporting shaft provided with the gear 268, as shown in Fig. 14, with which meshes the pinion 269 of the transmitter 271, the latter being electrically connected by the conductors diagrammatically indicated at 276 with a repeater 277. Said repeater is provided with a pinion 278 meshing with a gear 279, the shaft whereof is indicated at 280. The said gear is provided with an arm 281, herein shown as having the form of an elongated, rectangular frame, wherein is mounted for rotation a threaded shaft 282 provided at its inner end with a repeater 283 electrically connected by conductors diagrammatically indicated at 284 with a transmitter 285, the latter being geared or otherwise suitably connected with a range dial 286 having an indicator 287 which may be manually set in the manner described with reference to other forms of my invention, to indicate the determined range.

Through the described connections the threaded shaft 282 is rotated to an extent corresponding to the indicated range, thereby moving to the proper point along the arm 281 a cross arm 288 provided with a nut 289 engaging with said threaded shaft 282. Said cross arm 288 is provided with a longitudinal slot 290 wherein are received riders 291, 292, to operate the arms 293, 294, each longitudinally slotted as indicated at 295, 296. Said arms are respectively mounted upon gears 297, 298, that are spaced apart on the selected scale a distance corresponding to the distance apart of the torpedoes A, B controlled thereby. Said gears 297, 298 mesh with pinions 299, 300 carried by transmitters 301, 302 electrically connected by conductors diagrammatically indicated at 303, 304 to repeaters 305, 306 operatively associated with the torpedoes A, B having azimuth rings 307, 308. Each of said torpedoes is provided with a gyroscope, the rotor whereof is diagrammatically indicated respectively at 309, 310, and the contact arm of which is diagrammatically indicated respectively at 311, 312. The said repeaters 305, 306 are operatively associated with said contact arms, in a manner described in connection with other forms of my invention and not here necessary to describe or to illustrate in detail.

The repeater 275 previously referred to, is carried by the gear 279 and has an upright shaft 313, most clearly indicated in Fig. 17 and having fast thereon a pinion 314 meshing with a gear 315 loosely mounted upon the shaft 280 but having fast therewith a beveled gear 316. The said gear 315 has fast thereon an arm 317 longitudinally slotted as indicated at 318 to receive the extension 319 of the rider 291 whereby the angular movement imparted to said arm 317 through the repeater 275 is transmitted to the arm 293 and thence through the transmitter 301 and repeater 305 to the contact arm of the torpedo A.

It will be evident from the foregoing description that the angular movement imparted to the arm 317 corresponds to and is through the same angle as the angular movement imparted to the lever 258 when the hairs 247, 248 in the telescope are brought into register with the ends of the image of the enemy boat. For clearness of illustration, I have, however, represented the angle through which the arm 317 moves as exaggerated. Thus the angular movement transmitted through the arm 317 equals one-half of the angle B indicated in Fig. 12.

In order to transmit an angular movement to another element also equalling one half said angle B, but in the opposite direction, whereby movements equalling the entire angle may be transmitted, I have herein represented the beveled gear 316 as having meshing therewith a pinion 320 meshing with a beveled gear 321 co-axial with and of the same size as the beveled gear 316 and also loosely mounted upon the shaft 280. Fast to and co-axial with said beveled gear 321 is an arm 322 longitudinally slotted at 323 to receive an extension 324 of the rider 292.

It will be evident from the foregoing description that the angular movement imparted to the arm 317 causes an equal movement in the opposite direction of the arm 322 and hence a positioning of the arm 294.

The arm 281 will through the described connections be positioned to point in the same direction as the telescope 272 and thus will indicate the direction of the path of travel of the torpedo C controlled thereby. The said torpedo C is preferably provided with an azimuth ring 325 and with a contact arm 326 operatively associated with a repeater 327 electrically connected with the conductors 276. Said torpedo is provided with a gyroscope, the rotor whereof is indicated at 328.

The arms 293, 294 will through the described connections be turned into directions corresponding to and indicating the courses of the torpedoes A and B.

In Fig. 18, I have indicated at 329 a table that may be employed by me in firing torpedoes, the tubes whereof are mounted upon different portions of the ship and for example in the bow, amidships and in the stern, and in Fig. 19, I have presented a diagram indicating how certain values in said table are obtained.

In Figs. 7 and 8, I have represented one form of apparatus wherein the several torpedoes are mounted in juxtaposition or as a unit and in Fig. 9, I have shown a table which may be employed in firing the torpedoes when the tubes thereof are mounted as a unit or in juxtaposition. When, however, the torpedoes are not mounted as a unit, but are mounted upon different portions of the ship, as above set forth, it becomes necessary to provide a different table, inasmuch as therein enter the three factors of range, dispersion and the angle of the path of the torpedo with respect to the axis of the ship whereon the torpedo tubes are mounted. I therefore prepare a series of tables each computed for some dispersion that may be employed. I have in Fig. 18 represented a table employed for a dispersion of 300 feet and have therein indicated ranges of 1000, 2000, 3000, 4000, 5000, etc., yards. I have also indicated values for the various angles θ as for example 90°, 85°, 80°, etc. In using said table, if, for example, the range be 5000 yards and the value of angle θ be 80°, then by reading downwardly and from the left, the angle $N''''$ is found, which is the angle to which the indicator of the range dial is to be moved, as heretofore set forth. There will be provided a series of tables the dispersions whereof differ by some suitable amount as for example 50 feet.

In Fig. 19, I have indicated how the angles M, M', etc., are determined mathematically. Therein the longitudinal axis of the ship carrying the torpedoes is indicated at 320. The position of the several torpedo tubes, as, for example, those at the bow, amidships and stern are indicated at 321, 322, 323. The distances D equal the distances between the torpedo tubes upon the ship.

The range is indicated at R, the lines parallel therewith from the stern and bow torpedoes are indicated at R', R'', and the course of the enemy's ship is indicated at 324. The dispersion at range, which may be for example 300 feet, is indicated at L, L. The angle θ formed by the range R and axis of the ship 320 is known and the problem is to determine the value of the angles M, M' indicating the dispersion at range for the stern and bow torpedoes. We therefore have the following demonstration:

$$\frac{F}{D} = \sin \theta \qquad F = D \sin \theta$$
$$G = L - F \qquad G = L - D \sin \theta$$
$$\tan M = \frac{G}{R'} \qquad \tan M = \frac{L - D \sin \theta}{R'}$$
$$\tan M' = \frac{G'}{R''}, G = G' \qquad \tan M' = \frac{L - D \sin \theta}{R''}$$

In actual practice, the lines R', R'' are not quite equal and therefore the angles M, M' differ very slightly, but for ordinary ranges such difference is within the error of the apparatus.

The apparatus shown in Figs. 10 and 11 may be employed in connection with this method in the manner described with respect to Figs. 7, 8 and 9.

In the foregoing description, I have referred to a periscope as one of the types of sighting instrumentality which may be employed in the practice of my invention and in referring to the periscope I have indicated it as mounted for orientation upon a vertical exis. My invention may, however, be employed with other types of periscope, and I have in Figs. 20 and 21 shown means whereby my invention may be adapted to that type of periscope wherein the entire horizon and objects encircled thereby are projected onto a screen.

In Fig. 21, the circular screen whereunto the horizon and encircled objects are projected, is indicated at 325. Concentric therewith are two transparent and preferably blass discs indicated at 326, 327, pivoted at 328 and provided if desired with ball bearings or other means to facilitate their turning movement. One of said discs is provided with a radial hair line or mark 329 and the other is provided with a similar hair line or mark 330. In any suitable manner the said discs 326, 327 are adapted to be turned so that the lines 329, 330 may be caused to register with the ends of the image of the enemy boat indicated at 331. For this purpose I have represented each of said discs as having a toothed periphery wherewith mesh pinions 332, 333 upon shafts 334, 335, having hand wheels 336, 337.

The movements of said discs 326, 327 may be conveyed in suitable manner to the torpedoes controlled thereby and which are herein indicated as A and B. Herein for the purpose I have represented transmitters 338, 339 having pinions 340, 341 meshing with the teeth upon said discs 326, 327. Said transmitters are electrically connected by conductors diagrammatically indicated at 342, 343 with repeaters 344, 345 operatively associated with the contact arms 346, 347 of the torpedoes, the latter being provided with gyroscopes, the azimuth rings whereof are indicated at 348, 349 and the rotors whereof are indicated at 350, 351. In this or in any other suitable manner the movements of the discs 326, 327 are conveyed to the gyroscopes of the torpedoes in such manner that when discharged the torpedoes travel along paths corresponding to the hair lines 329, 330. In the disclosed type of my invention the positions of the contact arms 346, 347 correspond to the directions of the hair lines 329, 330.

The torpedoes A, B are in this type of my invention positioned as a unit. If such unit comprehends more than two torpedoes, such additional torpedo or torpedoes may be caused to take a path or paths intermediate those of the torpedoes A, B, in any suitable manner as for example by the arrangement shown in Fig. 1. If, however, it be desired to employ this type of my invention in the firing of torpedoes located at different positions upon the ship, I may modify the apparatus shown in said Figs. 20 and 21 to adapt it to the firing of such spaced torpedoes, as for example in the manner indicated in Figs. 12 to 17.

In connection with this form of my invention I may correct for the motion of the enemy boat by using any of the corrector devices heretofore disclosed or any other suitable device for the purpose.

Having thus described one illustrative embodiment of my invention, I desire it to be understood that although specific terms are employed, they are used in a generic and descriptive sense and not for purpose of limitation, the scope of the invention being set forth in the following claims.

Claims:

1. An apparatus for controlling torpedo firing comprising sighting means, a plurality of torpedoes, gyroscopes therefor having means co-acting therewith and synchronized in movement with the sighting means to control the paths of travel of the torpedoes, and means for modifying said paths of travel with relation to the range of the hostile object.

2. An apparatus for controlling torpedo firing comprising sighting means, a torpedo, means upon the torpedo synchronized in movement with the sighting means to control the path of the torpedo, and means to modify said path with reference to the range of the hostile object.

3. An apparatus for controlling torpedo firing comprising sighting means, a torpedo, a gyroscope thereon having co-acting means synchronized in movement with the sighting means, thereby to control the path of travel of the torpedo, and means to modify said path of travel dependent upon the range of the hostile object.

4. An apparatus for controlling torpedo firing comprising sighting means, a plurality of torpedoes, gyroscopes thereon, means co-acting with said gyroscopes and synchronized in movement with said sighting means, thereby to control the paths of travel of the torpedoes, and means to modify said paths of travel in accordance with the desired dispersion and the range of the hostile object.

5. An apparatus for controlling torpedo firing comprising sighting means, a torpedo, direction-maintaining means therefor having means synchronized in movement with the sighting means to control the path of travel of the torpedo, an indicator for dispersion and connections therefrom to said synchronized means.

6. An apparatus for controlling torpedo firing comprising sighting means, a torpedo, direction-maintaining means therefor having means synchronized in movement with the sighting means to control the path of travel of the torpedo, an indicator for range, and connections therefrom to said syncronized means.

7. An apparatus for controlling torpedo firing comprising sighting means, a torpedo, direction-maintaining means therefor having means synchronized in movement with the sighting means to control the path of travel of the torpedo, indicators for range and dispersion and connections therefrom to said synchronized means.

8. An apparatus for controlling torpedo firing comprising sighting means, a plurality of torpedoes each having a gyroscope, means pertaining to said gyroscopes and synchronized in movement with said sighting means, indicating means for dispersion, and means connecting said indicating means and said synchronized means.

9. An apparatus for controlling torpedo firing comprising sighting means, a plurality of torpedoes, each having a gyroscope, means pertaining to said gyroscopes and synchronized in movement with said sighting means, indicating means for range and connections between said indicating means and said synchronized means.

10. An apparatus for controlling torpedo firing comprising sighting means, a plurality of torpedoes, means to control the paths of travel of said torpedoes through the sighting means, and means to modify said paths for the desired range and dispersion.

11. An apparatus for controlling torpedo firing comprising sighting means, a centralized control, a plurality of torpedoes positioned in proximity to each other, direction-maintaining means for each of said torpedoes, means co-acting with said centralized control and said direction-maintaining means to cause said plurality of torpedoes to travel in series toward a common object, and co-acting means to modify the paths of travel of said torpedoes.

12. An apparatus for controlling torpedo firing comprising sighting means, a torpedo having direction-maintaining means synchronized in movement with the orientation of said sighting means, and means for maintaining the synchronized position of the direction-maintaining means notwithstanding movement of the basal support of the torpedo.

13. An apparatus for controlling torpedo firing comprising sighting means, a torpedo having direction-maintaining means synchronized in movement with the orientation of said sighting means, and a gyroscopic compass for maintaining the synchronized position of the direction-maintaining means notwithstanding movement of the basal support of the torpedo.

14. An apparatus for controlling torpedo firing comprising sighting means provided with means adapted to be brought into register with desired parts of a target, a plurality of torpedoes having direction-maintaining means provided with members adapted to be synchronized in movement with the orientation of the sighting means, and means to control the path of travel of said torpedoes in accordance with the position of said registering means.

15. An apparatus for controlling torpedo firing comprising sighting means provided with means adapted to be brought into register with desired parts of a target, a torpedo having direction-maintaining means provided with a member adapted to be synchronized in movement with the orientation of the sighting means, and means to control the path of travel of the torpedo in accordance with the position of the registering means.

16. An apparatus for controlling torpedo firing comprising sighting means provided with means adapted to be brought into register with desired parts of a target, a plurality of torpedoes each having a gyroscope provided with means adapted to be synchronized in movement with the orientation of the sighting means, and means to control the path of travel of said torpedoes in accordance with the position of said registering means.

17. An apparatus for controlling torpedo firing comprising sighting means provided with means adapted to be brought into register with desired parts of a target, a torpedo having a gyroscope provided with a member adapted to be synchronized in movement with the orientation of the sighting means, and means to control the path of travel of the torpedo in accordance with the position of the registering means.

18. An apparatus for controlling torpedo firing comprising sighting means provided with a line adapted to be brought into register with the desired portion of a target, a torpedo having direction-maintaining means adapted to be synchronized in movement with the orientation of the sighting means, and means to control the path of travel of the torpedo in accordance with the position of the said line.

19. An apparatus for controlling firing of a plurality of torpedoes comprising sighting means provided with lines adapted to be positioned in accordance with desired parts of a target, and means mechanically to transfer the obtained angle and to control the paths of travel of the torpedoes in accordance with said angle.

20. An apparatus for controlling torpedo firing comprising sighting means provided with lines adapted to be positioned in accordance with desired parts of a target, a plurality of torpedoes provided with gyroscopes, and means to adjust said gyroscopes in accordance with the position of said lines.

21. An apparatus for controlling torpedo firing comprising sighting means provided with lines adapted to be brought into register with desired parts of a target, a plurality of torpedoes having direction-maintaining means provided with means adapted to be synchronized in movement with the orientation of the sighting means to control the paths of travel of said torpedoes in accordance with the position of said registering means, and means to correct for range.

22. An apparatus for controlling torpedo firing comprising sighting means adapted to be brought into register with desired parts of a target, a torpedo having direction-maintaining means provided with a member adapted to be synchronized in movement with the orientation of the sighting means, means to control the path of travel of the torpedo in accordance with the position of the registering means, and means to correct for range.

23. An apparatus for controlling torpedo firing comprising a periscope adapted to project the entire horizon, a plurality of torpedoes having direction-maintaining means, means associated with the periscope and adapted to be brought into register with a part or parts of the image of the target, and means controlled thereby and adapted to adjust the direction-maintaining means.

24. An apparatus for controlling torpedo firing comprising a periscope adapted to project the entire horizon, a plurality of torpedoes each having a gyroscope, means associated with the periscope adapted to be brought into register with a part or parts of the image of a target, and means controlled thereby and adapted to adjust said gyroscope.

25. An apparatus for controlling torpedo firing comprising sighting means, a torpedo having direction-maintaining means synchronized in movement with the orientation of said sighting means, means for correcting for the path of travel of the torpedo, in accordance with factors pertaining to target or torpedo movement, and means for maintaining the synchronized position of the direction-maintaining means nothwithstanding movement of the basal support of the torpedo.

26. An apparatus for controlling torpedo firing comprising sighting means, a torpedo having direction-maintaining means synchronized in movement with the orientation of said sighting means, means to correct for the path of travel of the torpedo, in accordance with factors pertaining to target or torpedo movement, and a gyroscopic compass for maintaining the synchronized position of the direction-maintaining means notwithstanding movement of the basal support of the torpedo.

In testimony whereof, I have signed my name to this specification, in the presence of two subscribing witnesses.

JOHN HAYS HAMMOND, Jr.

Witnesses:
ROBERT H. KAMMLER,
MAY H. LOWRY.